Figure 3:
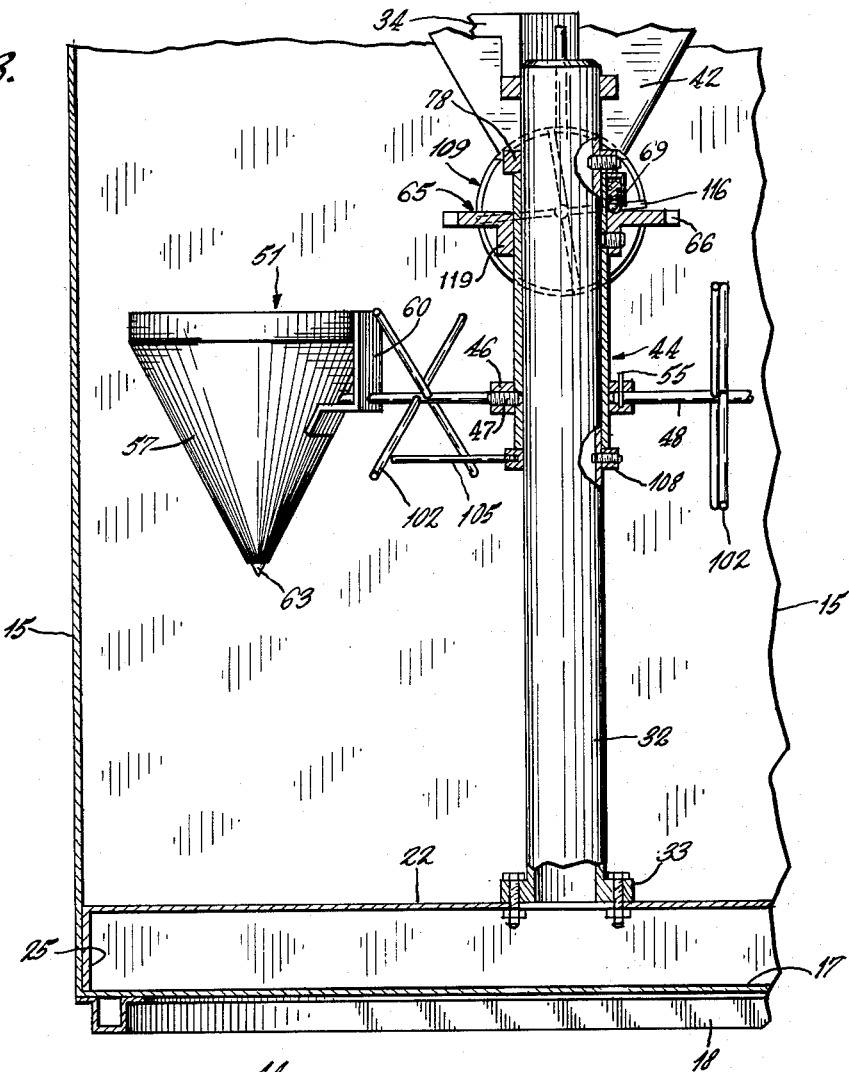

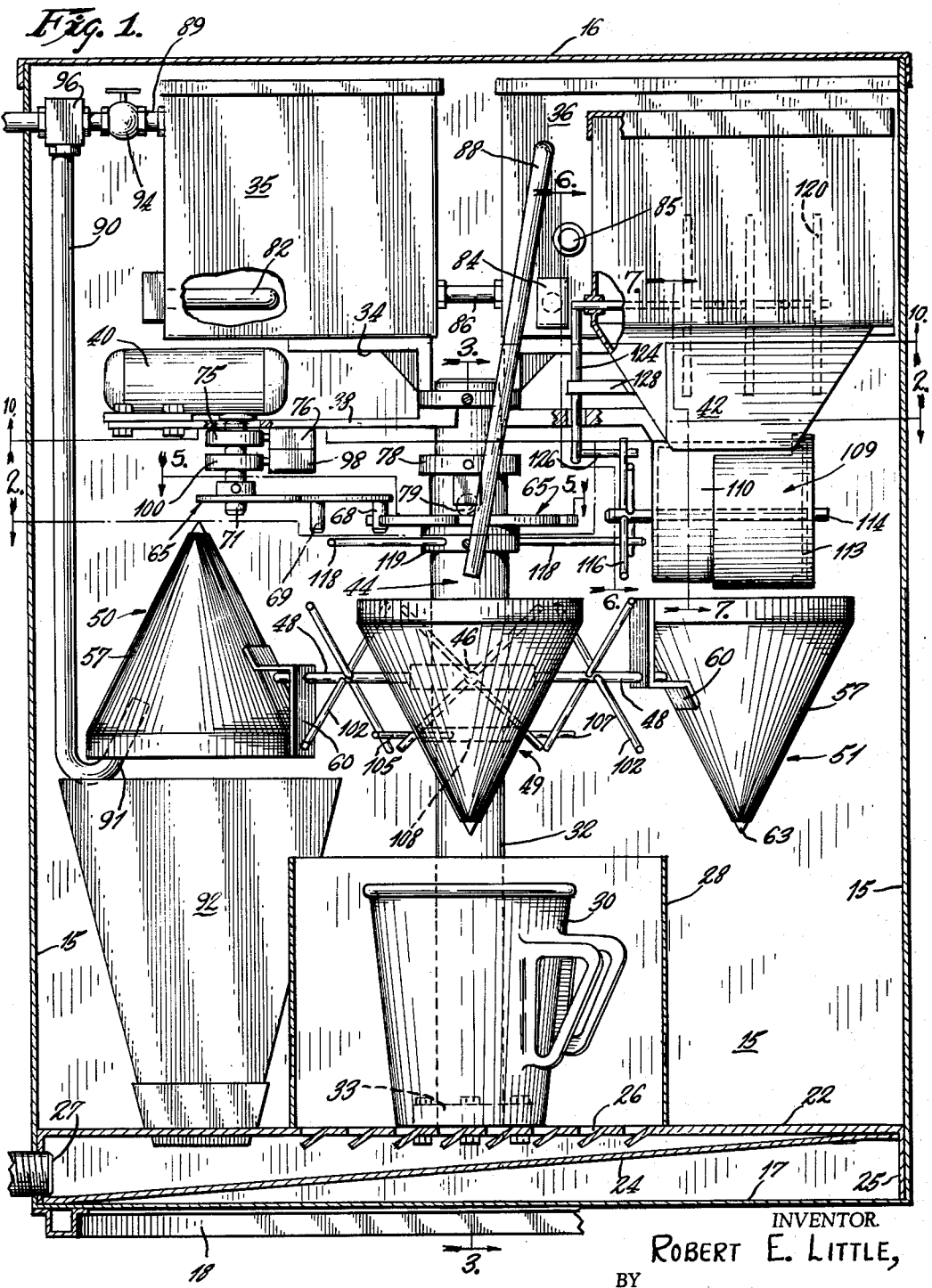

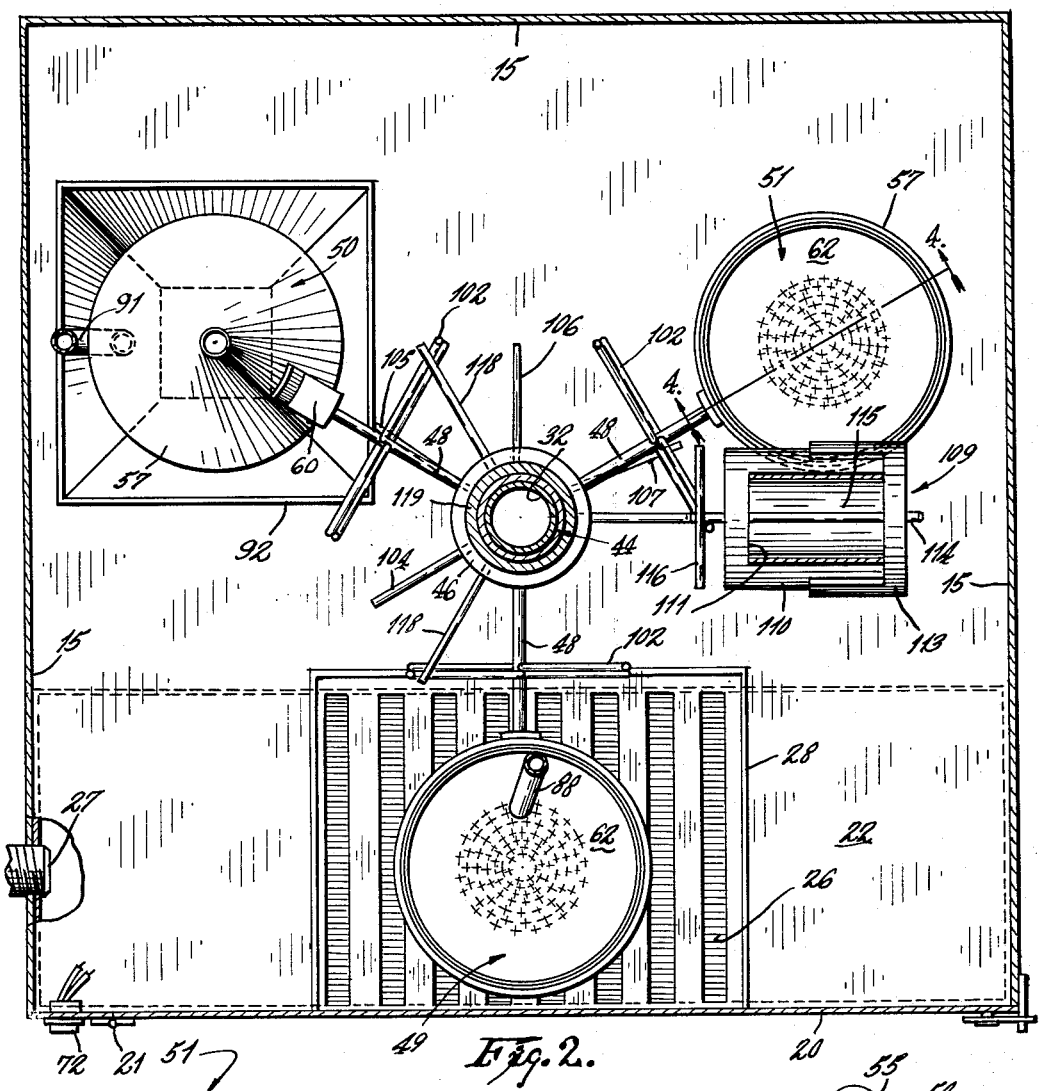
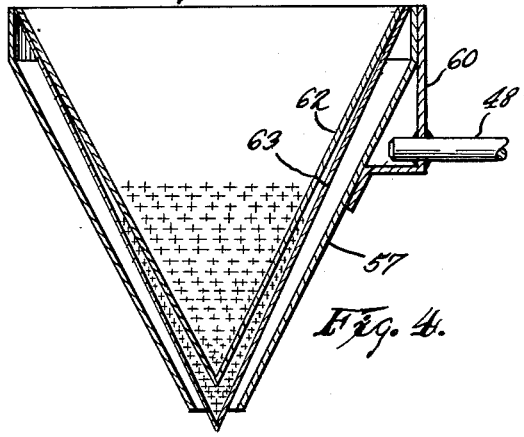
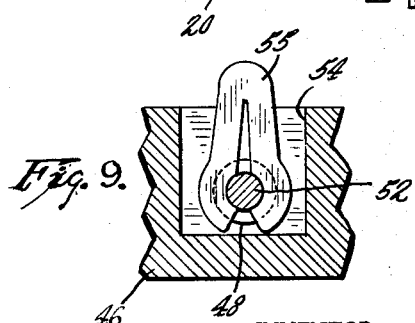
INVENTOR.
ROBERT E. LITTLE,
BY
Trask, Jenkins & Hanley
ATTORNEYS.

June 7, 1966 R. E. LITTLE 3,254,589
COFFEE DISPENSER
Filed March 18, 1963 5 Sheets-Sheet 3

INVENTOR.
ROBERT E. LITTLE,
BY
ATTORNEYS.

June 7, 1966  R. E. LITTLE  3,254,589
COFFEE DISPENSER
Filed March 18, 1963  5 Sheets-Sheet 4
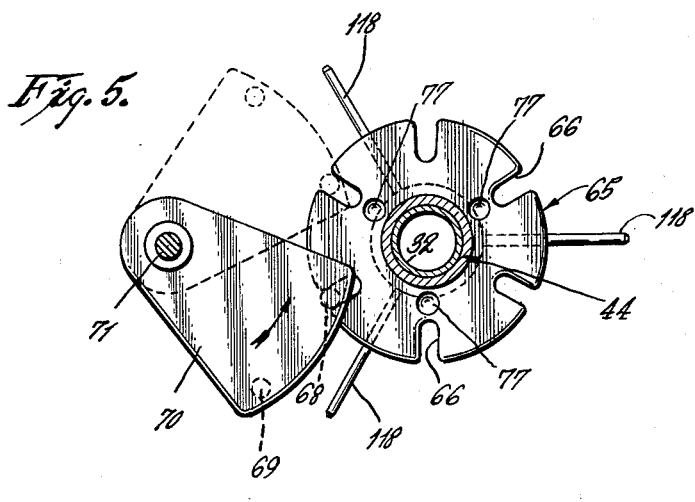
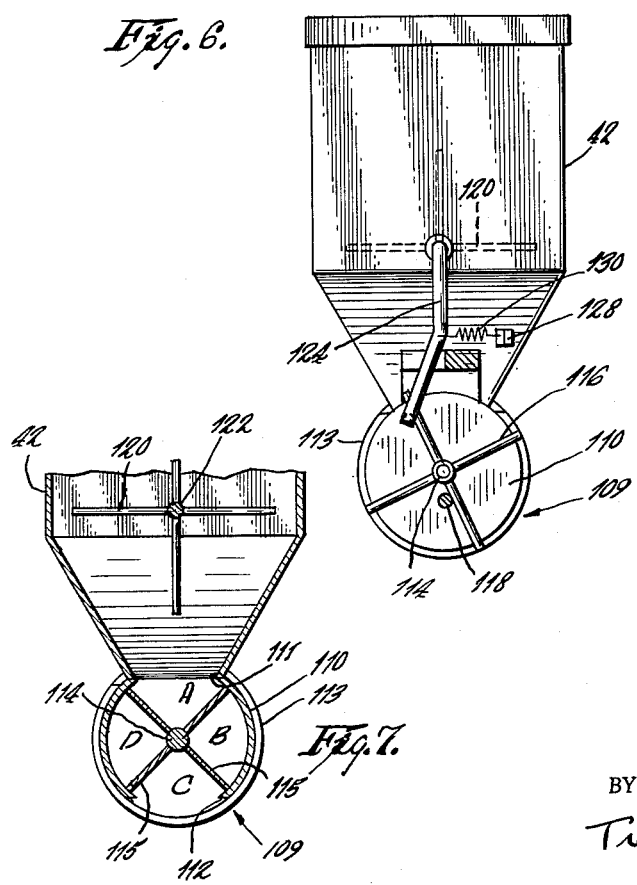
INVENTOR.
ROBERT E. LITTLE,
BY
ATTORNEYS.

June 7, 1966   R. E. LITTLE   3,254,589
COFFEE DISPENSER
Filed March 18, 1963   5 Sheets-Sheet 5
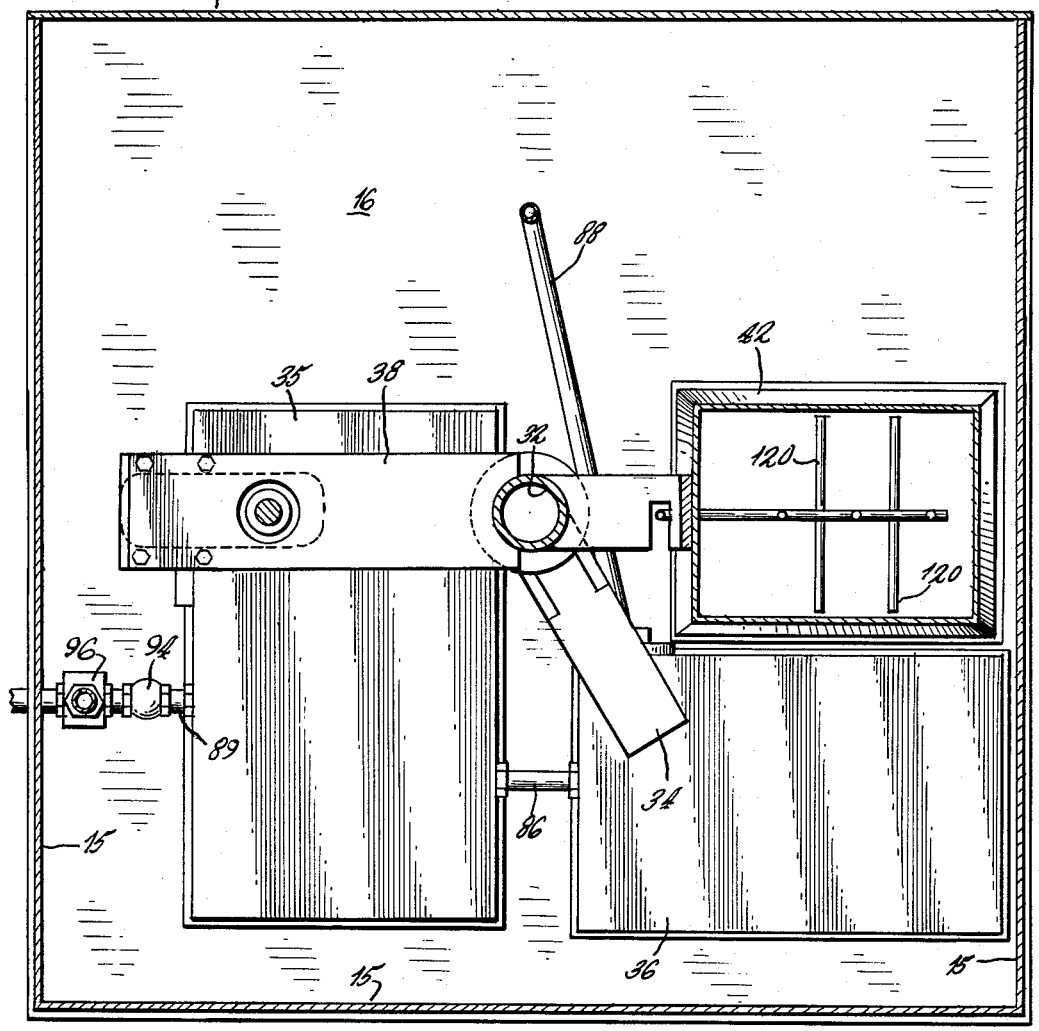
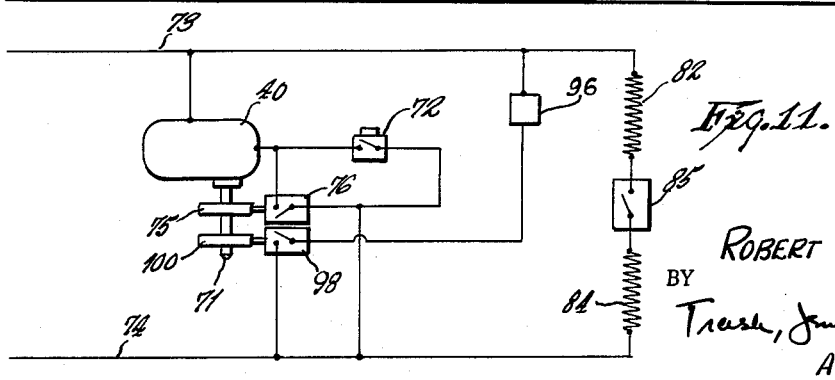
INVENTOR.
ROBERT E. LITTLE,
BY
ATTORNEYS.

United States Patent Office 3,254,589
Patented June 7, 1966

3,254,589
COFFEE DISPENSER
Robert E. Little, Columbus, Ind., assignor to Arvin Industries, Inc., Columbus, Ind., a corporation of Indiana
Filed Mar. 18, 1963, Ser. No. 265,923
17 Claims. (Cl. 99—289)

This invention relates to an apparatus for brewing coffee and dispensing the brew therefrom.

It is an object of my invention to provide a coffee dispenser which will freshly brew and dispense coffee, which will permit the use of regular ground coffee, which can be adjusted to control the strength of the brew dispensed, and which will dispense the brew at a uniform and controlled temperature. It is a further object of my invention to provide a coffee dispenser which may be of compact size, which will be simple and easy to operate, and which can be economically manufactured largely from inexpensive sheet-metal components.

In accordance with the preferred form of my invention, there is provided a housing having a cup-receiving opening in one of its walls and provided with a floor adapted to drain away liquid and solid wastes. An upright shaft is mounted on said floor within the housing and supports a rotatable sleeve adapted to be driven in a step-wise rotation about the shaft by suitable driving means. A plurality of angularly spaced arms radiate outwardly from the sleeve and support a plurality of filter cups which are successively advanced by the step-wise rotation of the sleeve from a coffee-receiving station a dispensing station to a rinsing station, the dispensing station being located immediately adjacent the cup-receiving opening in the housing.

The filter cups are rotatable about the axes of their supporting arms, and said arms are provided with pluralities of outwardly projecting fingers engageable with a plurality of spokes fixedly mounted on the sleeve for rotating said filter cups to an inverted position as said cups are moved to the rinsing station from the dispensing and back to an upright position as said cups are moved from the rinsing station to the coffee-receiving station. A conduit at the rinsing station is connected to a water source for flushing and rinsing the interior of the filter cups at said rinsing station. A receiver is mounted on the housing floor to receive the waste material flushed from the filter cups and said waste material to the floor for discharge therefrom.

A coffee dispenser is supported from the shaft above the coffee-receiving station. Said coffee dispenser is compartmented by a plurality of paddles carried on a rotatable shaft projecting outwardly from the dispenser and having a plurality of fingers thereon. The fingers on said shaft are engaged by a plurality of spokes carried on the rotatable sleeve for thus rotating the shaft and the paddles thereon to advance the compartments formed by said paddles into alignment with an opening formed in the bottom of the dispenser for dispensing coffee into the filter cups when they are positioned at the coffee-receiving station. Conveniently, the size of the dispenser opening is controllable for adjusting means for adjusting the amount of coffee discharged therethrough.

A pair of tanks are mounted in the housing and are connected in series to each other. Each of said tanks is provided with a heating element, and at least one of said tanks is provided with a thermostat for controlling the operation of said heating element. One of the pair of tanks is connected to a water source and is also connected at its lower end to the lower end of the second tank so that said first tank forms a preheat water tank. A conduit extends downwardly from a point adjacent the upper end of the second tank and terminates in a position to discharge water into the filter cups when they are located at the dispensing station. Means are provided for introducing a measured quantity of water into the preheat water tank so that an equal quantity of water will be displaced into the second tank for discharge through the conduit connected thereto into the filter cup at the dispensing station. The filter cup at the dispensing station will already have had the dry coffee introduced into it from the dispensing station, and the water entering said filter cup at the dispensing station thus produces a brew which filters through the filter cup into a cup disposed in the housing opening.

Figure 8:
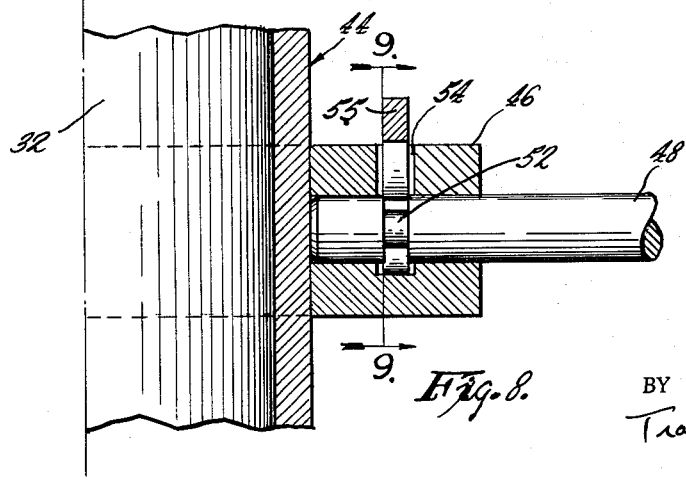

Other objects and features of my invention will become apparent from the more detailed description which follows and from the accompanying drawings, in which:

FIG. 1 is a vertical section of a coffee dispenser embodying my invention;
FIG. 2 is a horizontal section taken on the line 2—2 of FIG. 1;
FIG. 3 is a fragmentary vertical section taken on the line 3—3 of FIG. 1;
FIG. 4 is a vertical section taken on the line 4—4 of FIG. 2;
FIG. 5 is a horizontal section taken on the line 5—5 of FIG. 1;
FIG. 6 is a vertical section taken on the line 6—6 of FIG. 1;
FIG. 7 is a vertical section taken on the line 7—7 of FIG. 1;
FIG. 8 is an enlarged fragmentary vertical section showing the interconnection of one of the filter cups to the filter housing shaft;
FIG. 9 is a vertical section taken on the line 9—9 of FIG. 8;
FIG. 10 is a horizontal section taken on the line 10—10 of FIG. 1; and
FIG. 11 is a schematic wiring diagram for the coffee dispenser shown in FIG. 1.

As shown in the drawings, my coffee dispenser is enclosed within a housing formed from a plurality of interconnected sidewalls 15 closed at their upper ends by a top wall 16 and at their lower ends by a floor 17 conveniently supported upon a base frame 18. The sidewalls 15 extend around three sides of the housing, and the fourth side of the housing is enclosed by a door 20 swingably mounted on one of sidewalls 15, as at 21. Desirably, the housing is provided with a pair of false floors 22 and 24. The floor 22 is bent downwardly along its edges, as at 25, to support it in an elevated position above the floor 17 and to permit it and the components carried thereon to be slid out the front of the housing. The floor 24 is connected to the floor 22 along one of its edges and slopes downwardly from said connection with its opposite edge resting on the floor 17. A forward section of the floor 22 is grated at 26 to permit waste material to fall onto the sloping floor 24 where it will drain to a discharge conduit 27 mounted in one of the sidewalls 15. The door 20 has an opening extending upwardly from the grating 26, and a vertical wall 28 extends inwardly from said opening to thus define a cup-receiving opening so that a cup 30 may be inserted in said opening to rest upon the grating 26.

A shaft 32 is bolted to the floor 22, as at 33, and extends upwardly through the central portion of the housing. A bracket 34 is mounted on the upper end of the shaft 32 and projects radially therefrom to support a pair of water tanks 35 and 36 within the housing. A second bracket 38 is also mounted on the shaft 32 and radiates outwardly from said shaft to support a motor 40 and coffee hopper 42. Rotatably carried on the shaft 32 below the bracket 38 is a sleeve 44 provided with a collar 46 connected thereto by a screw 47 and having three equally spaced radially projecting arms 48 mounted thereon and supporting filter cups 49, 50, and 51. As shown in FIGS. 8 and 9, the inner end of each of the arms 48 is received in a radially extending opening in the collar 46 and is provided with a reduced diameter neck 52 within the axial extent of said opening. The neck 52 is in alignment with a vertical extending opening 54 in the collar 46 adapted to receive a spring clip 55 received around the arm neck 52. In this manner, each of the arms 48 is releasably mounted on the collar 46, but is rotatable on its axis normal to the axis of the shaft 32.

The filter cups 49–51 are identical in construction, and each comprises an open-ended frustoconical outer shell 57. A bracket 60 is mounted on the shell 57 adjacent its large diameter end and is fixedly connected to the outer end of the adjacent arm 48 above the center of gravity of the filter cup. A pair of conical filter screens 62 and 63 are connected to each other and to the shell 57 adjacent the enlarged end of the shell, but have their wall portions spaced from each other and from the shell 57 throughout the remainder of their extent. The openings in the screen 62 are larger than the openings in the screen 63 so that said screens provide a pair of filters of different porosity for brewing the coffee as will become more apparent hereinafter.

The filter cups 49–51 are rotatable about the shaft 32 in a step-wise sequence from a coffee-receiving station to a dispensing station to a rinsing station. With the filter cups disposed in the positions illustrated in the drawings, the filter cup 49 is in the dispensing station located above the cup 30, the filter cup 50 is located at the rinsing station, and the cup 51 is located in the coffee-receiving station. As shown in FIG. 5, to move the filter cups through such a step-wise sequence, a drive wheel 65 having six equally spaced slots 66 extending inwardly from its periphery is fixedly mounted on the sleeve 44. The drive wheel 65 is rotated by the motor 40 through a pair of studs 68 and 69 on an arm 70 mounted on the output shaft 71 of the motor. A momentary switch 72 connected to lines 73 and 74 supplying electrical current to the dispenser energizes the motor 40. When the switch 72 is closed, the motor 40 will rotate the shaft 71 causing a cam 75 mounted on the output shaft 71 to close a solenoid switch 76 by-passing the momentary switch 72 for thus supplying current to the motor 40 through the lines 73 and 74. The cam 75 causes the switch 76 to remain closed for a period of time sufficient to energize the motor 40 to rotate the shaft 71 through a portion of one revolution to cause the stud 68 to bear against the edge of the adjacent wheel slot 66 to rotate the wheel through an arc of 60° and bring the stud 69 into engagement with the next adjacent wheel slot 66 and rotate the wheel through a second 60° of revolution. This rotates the sleeve 44 120° about the shaft 32 to advance the filter cups 49–51 from one station to the next adjacent station. After the arm 70 has been rotated into the dotted line position shown in FIG. 5, it will again be brought into the full line position shown in FIG. 5 for again effecting rotation of the wheel 65 upon closing of the momentary switch 72.

Desirably, three equally angularly spaced depressions 77 are formed in the wheel 65. A collar 78 is mounted on the shaft 32 and carries a spring-biased ball 79 which is receivable in the depression 77 which is brought into alignment with the dispensing station. In this manner, the filter cups will be releasably retained in the three stations until the drive wheel is again rotated by the studs 68 and 69.

The water tanks 35 and 36 are provided with electrical resistance heating elements 82 and 84 controlled by a thermostat switch 85 connected to the lines 73 and 74. The tanks are interconnected at their lower ends by a pipe 86 forming a flow passage between said tanks. A conduit 88 is connected to the tank 36 adjacent its upper end and extends downwardly therefrom to terminate at a point immediately above the filter cup disposed at the dispensing station.

The tank 35 is connected to a water source by a pipe 89 extending from its connection to the tank 35 outwardly through the housing. A conduit 90 is connected to the pipe 89 and extends downwardly within the housing with its discharge end turned upwardly, as at 91, at the rinsing station. The discharge end of the conduit 90 is disposed in alignment above an open ended receiver 92 mounted in the floor 22. The upper end of the receiver has a cross-sectional extent greater than the enlarged ends of the filter cups, and the lower end of said receiver is disposed below the plane of the floor 22 in open communication with the sloping floor 24 so that said receiver will catch and dispose of the waste materials flushed from the filter cups at the rinsing station.

The amount of water introduced into the tank 35 and thus displaced into the tank 36 through the pipe 86 for discharge through the conduit 88 is controlled by a manually controlled valve 94 and by a solenoid valve 96. The solenoid valve 96 is actuated by a solenoid switch 98 energized by a cam 100 mounted on the motor output shaft 71. Thus, with the valve 94 in proper adjustment, rotation of the output shaft 71 will cause the cam 100 to close the solenoid switch 98 energizing the valve 96 so that water will be introduced into the tank 35 and into the conduit 90. A volume of water equal to the volume of water introduced into the tank 35 will be discharged from said tank through the pipe 86 into the tank 36 to raise the level of the water in the tank 36 thus causing a predetermined amount of said water to be discharged through the conduit 88 into the filter cup disposed at the dispensing station.

As shown in FIG. 1, it is necessary that the filter cup at the dispensing station be located in an upright position for reception of the water from the conduit 88 and for dispensing a filtered brew into the cup 30. It is also necessary that the filter cup located at the rinsing station be disposed in an inverted position in order that the water exiting the conduit 90 will flush the interior of said filter cup and cause the waste material to be rinsed therefrom into the receiver 92. To effect such rotation of the filter cups, a plurality of fingers 102 are mounted on each of the arms 48 between the collar 46 and brackets 60. The fingers 102 are spaced 90° apart about the axes of the arms 48 and are engaged by a plurality of spokes 104, 105, 106, and 107 radiating outwardly from a ring 108 fixedly mounted on the shaft 32 below the sleeve 44. As shown in FIG. 2, the spokes 104–107 are mounted on the ring 108 between the dispensing station and the coffee-receiving station. Said spokes are arranged on the ring 108 so that a pair of said spokes engage a pair of fingers 102 as a filter cup is moved from the dispensing station to the rinsing station and from the rinsing station to the coffee-receiving station. During rotation of the filter cups, the spoke 104 will engage an adjacent finger 102 on the arm 48 of the adjacent filter cup to rotate said filter cup one-quarter of a turn toward an inverted position. Concurrently, the spoke 106 will engage a finger 102 on the filter cup leaving the dispensing station to rotate it one-quarter of a turn toward its upright position. Continued rotation of the filter cups will cause the spoke 105 to engage the next adjacent finger 102 to rotate the filter cup into its fully inverted position as shown by the cup 50 in FIG. 1. And concurrently, the spoke 107 will engage the next adjacent finger 102 on the adjacent filter cup to rotate said filter cup into its fully upright position as shown by the cup 51 in FIG. 1. As the filter cup is rotated into its fully inverted position at the rinsing station, it is received over the upturned end 91 of conduit 90 so that the water discharged from said conduit will flush the grounds from the filter cup into the receiver 92.

As shown in FIGS. 1, 6 and 7, the lower end of the coffee hopper 42 is connected to a coffee dispenser 109 comprising a closed end cylinder 110 having an inlet opening 111 in its upper side in open communication with the bottom of the hopper 42 and a discharge opening 112 in its lower side. A sleeve 113 is axially slidable on the cylinder 110 for adjusting the cross-sectional extent of the opening 112 and controlling the amount of coffee discharged from the dispenser. A shaft 114 extends axially through the cylinder 110 and has a plurality of paddles 115 rigidly mounted thereon which ride against the inner face of the cylinder 110 and divide said cylinder into a plurality of compartments. One end of the shaft 114 extends outwardly from the cylinder 110 and has a plurality of radially extending fingers 116 operatively engaged by a plurality of angularly spaced spokes 118 radiating outwardly from a ring 119 mounted on the sleeve 44 and constituting the hub of wheel 65. As will be apparent from FIG. 7, the compartments formed by the paddles 115 are rotatably advanced around the interior of the cylinder 110 as the spokes 118 engage the fingers 116 to rotate the shaft 114. With the paddles in the position shown in FIG. 7, the compartment A is in position to receive coffee from the hopper 42, the compartment B is in a coffee storage position, the compartment C is in position for discharging the coffee into the filter cup passing under opening 112, and the compartment D is empty and ready to be advanced into position to receive coffee from the hopper 42.

In order to insure a full and uniform flow of coffee from the hopper 42 into the dispenser 109, a plurality of agitators 120 are mounted on a shaft 122 in the hopper 42. The shaft 122 extends outwardly from said hopper and terminates in a downwardly projecting rocker arm 124 having a finger 126 at its lower end engageable with the fingers 116 on the dispenser shaft 112. As the fingers 116 are rotated by the spokes 118, they will successively engage the rocker arm finger 126 for moving the agitators 120 within the hopper 42. A bracket 128 is mounted on the hopper 42 adjacent the rocker arm 124 and is interconnected to said rocker arm by a spring 130. Thus, the fingers 116 engaging the rocker arm finger 126 will cause the agitators 120 to move in one direction, and the spring 130 will cause said agitators to move in an opposite direction for thus keeping the coffee in the hopper in a free flowing state.

The operation of my dispenser may be described as follows: A cup 30 is inserted in the opening in the housing door 20 and is supported on the floor 22 within extent of its grating 26. The momentary switch 72 is then closed causing the motor 40 to move the arm 70 from its dotted line position shown in FIG. 5 to the full line position, whereupon cam 75 closes the switch 76 to energize the motor 40 for rotating the arm 70 from its full line to its dotted line position shown in FIG. 5. This simultaneously advances the filter cup 49 from the dispensing station to the rinsing station previously occupied by the filter cup 50, and the filter cup 50 from the rinsing station to the coffee-receiving station previously occupied by the filter cup 51, and the filter cup 51 from the coffee-receiving station to the dispensing station previously occupied by the filter cup 49. As the filter cup 49 is moved to the rinsing station, it will be rotated into its inverted position by the fingers 102 and spokes 104 and 105. Simultaneously, the filter cup 50 will be rotated into its upright position by its fingers 102 and the spokes 106 and 107 as it is moved from the rinsing station to the coffee-receiving station.

As the filter cup 51 is moved toward the dispensing station, the spokes 118 will engage the fingers 116 to rotate the paddles 115 in the coffee dispenser 109 to bring the compartment B into alignment with the dispenser opening 112 for discharging the dry coffee into the filter cup 51 as it passes under the dispenser. Simultaneously, one of the fingers 116 will bear against the rocker arm finger 126 causing the rocker arm 124 to move the agitators 120 within the hopper, the rocker arm 124 and the agitators 120 being moved in an opposite direction by the action of the spring 130 when the finger 116 clears the finger 126. This deposits the desired amount of coffee into the filter cup 51 so that when said filter cup is in the dispensing station below the conduit 88, the water entering into the filter cup will produce the coffee brew which is discharged through the bottom of said filter cup into a cup 30.

When the filter cups have been indexed in their respective stations, the cam 100 actuates the solenoid switch 98 to open the solenoid valve 96. Opening of the valve 96 causes water to be discharged through the conduit 90 to rinse the grounds from the filter cup at the rinsing station with the rinsed wastes falling into the receiver 92 and being carried away through the conduit 27. Simultaneously, water enters the preheat water tank 35 and an equal volume of water is displaced from the tank 35 into the discharge water tank 36 causing the water level in the tank 36 to rise for discharging water through the conduit 88 into the filter cup at the dispensing station and which had previously received the dry coffee from the dispenser 109. The water entering the filter cup at the dispensing station produces a coffee brew within said filter cup which filters through the screens 62 and 63 and is discharged into the cup 30 as a filtered brew. The speed of the motor 40 is such that it will not cause the cam 100 to open the switch 98 until the coffee within the filter cup at the dispensing station has been brewed and discharged from said filter cup into the cup 30.

While I have described my invention as being used with regular coffee, it is to be understood, of course, that it may be employed to dispense other beverages such as instant coffee, tea, etc.

I claim:

1. An apparatus for brewing coffee and dispensing the brew therefrom, comprising a housing having a vertical shaft carried therein, a member rotatably carried on said shaft and movable only in a horizontal plane, a plurality of filter cups radiating outwardly from said member and angularly spaced thereabout for rotation therewith, drive means movable in a plane parallel to said horizontal plane for rotating said member in said horizontal plane about the axis of said shaft to advance said filter cups in a step-wise sequence between three successive stations comprising a coffee-receiving station, a dispensing station, and a rinsing station, said stations being angularly spaced about said axis, said housing having an opening formed therein for the reception of a cup for receiving the brewed coffee from the filter cup at the dispensing station, a coffee dispenser mounted in said housing for dispensing dry coffee into the filter cup at said coffee-receiving station, a first conduit connected to a heated water source and having a discharge outlet angularly spaced about said axis with respect to said coffee dispenser for discharging water into the filter cup at said dispensing station whereby said water will contact the coffee in said filter cup and the resultant brew will pass therefrom into said cup, means for rotating said filter cups to and from an inverted positions as they are moved to and from said rinsing station, respectively, and a second conduit connected to a water source and having a discharge outlet angularly spaced about said axis with respect to said coffee dispenser and the discharge outlet of said first conduit for flushing the coffee from the inverted filter cup at said rinsing station.

2. An apparatus for brewing coffee and dispensing the brew therefrom, comprising a housing having a vertically extending shaft mounted therein, a sleeve rotatably carried on said shaft and movable only in a horizontal plane, a plurality of filter cups radiating outwardly from said sleeve and angularly spaced thereabout for rotation therewith, drive means movable only in a plane parallel to said horizontal plane for rotating said sleeve in said horizontal plane about the axis of said shaft for advancing said filter cups in a step-wise sequence between three successive stations comprising a coffee-receiving station, a dispensing station, and a rinsing station, said stations being angularly spaced about said axis, means engageable with said sleeve for releasably locking said sleeve in position to locate said filter cups at said coffee-receiving, dispensing, and rinsing stations, a coffee dispenser mounted in said housing for dispensing dry coffee into the filter cup at said coffee-receiving station, a first conduit connected to a heated water source and having a discharge outlet angularly spaced about said axis with respect to said coffee dispenser for discharging water into the filter cup at said dispensing station whereby said water will contact the coffee in said filter cup and the resultant brew will pass therefrom into said cup, means for rotating said filter cups to and from an inverted position as they are moved to and from said rinsing station, respectively, and a second conduit connected to a water source and having a discharge outlet in the path of rotation of said filter cups angularly spaced about said axis with respect to said coffee dispenser and the outlet of said first conduit for flushing the coffee from the inverted filter cup at said rinsing station.

3. An apparatus for brewing coffee and dispensing the brew therefrom, comprising a housing having a vertically extending shaft mounted therein, a sleeve rotatably carried on said shaft, a plurality of angularly spaced filter cups mounted on arms rotatably mounted on said sleeve, means for rotating said sleeve in a stepwise sequence for successively advancing said filter cups from a coffee-receiving station to a dispensing station to a rinsing station, said housing having an opening formed therein for the reception of a cup for receiving the brewed coffee from the filter cup at the dispensing station, a coffee dispenser mounted in said housing for dispensing dry coffee into the filter cup at said coffee-receiving station, a first conduit connected to a heated water source for discharging water into the filter cup at said dispensing station whereby said water will contact the coffee in said filter cup and the resultant brew will pass therefrom into said cup a plurality of fingers mounted on said arms, a plurality of spokes mounted on said shaft and projecting outwardly therefrom between said dispensing and rinsing stations and between said rinsing and coffee-receiving stations for engaging said fingers upon rotation of said sleeve for rotating said filter cups to and from an inverted position as they are moved to and from said rinsing station respectively, and a second conduit connected to a water source for flushing the coffee from the inverted filter cup at said rinsing station.

4. An apparatus as set forth in claim 3 in which each of said filter cups comprises a generally frustro conical shell having a pair of interfitting conical screens mounted therein, the major portions of the wall surfaces of said screens being spaced from each other and from the walls of the cup.

5. An apparatus as set forth in claim 4 with the addition that each of said shells has a bracket mounted on its outer face, and the arms interconnecting the filter cups to the sleeve are connected to said brackets above the center of gravity of said filter cups.

6. An apparatus for brewing coffee and dispensing the brew therefrom, comprising a housing having a vertically extending shaft mounted therein, a sleeve rotatably carried on said shaft, a plurality of angularly spaced filter cups interconnected to said sleeve for rotation therewith, means for rotating said sleeve in a step-wise sequence for successively advancing said filter cups from a coffee-receiving station to a dispensing station to a rinsing station, a coffee dispenser mounted in said housing above the path of rotation of said filter cups, means for actuating said coffee dispenser for dispensing dry coffee into the filter cup at the coffee-receiving station, a first conduit connected to a heated water source for discharging water into the filter cup at said dispensing station whereby said water will contact the coffee in said filter cup and the resultant brew will pass therefrom into said cup, means for rotating said filter cups to and from an inverted position as they are moved to and from said rinsing station, respectively, and a second conduit connected to a water source for flushing the coffee from the inverted filter cup at said rinsing station, said coffee dispenser comprising a cylinder having an opening formed in its bottom face, a rotatable shaft extending axially of said cylinder having a plurality of paddles mounted thereon and dividing said cylinder into a plurality of compartments, and said means for actuating said coffee dispenser comprising a plurality of fingers mounted on said shaft outside the extent of said cylinder, and a plurality of spokes on said sleeve engageable with said fingers upon rotation of said sleeve to rotate said shaft for causing said compartments to be successively advanced into open communication with the opening in said cylinder.

7. An apparatus as set forth in claim 6 with the addition that an axially slidable sleeve is mounted on said cylinder for adjusting the size of the opening formed therein.

8. An appaartus as set forth in claim 6 with the addition that a coffee hopper is mounted in said housing, said hopper having an open bottom in communication with an opening formed in the top face of said cylinder for discharging coffee into said compartments.

9. An apparatus as set forth in claim 6 with the addition that a coffee hopper is mounted in said housing, said hopper having an open bottom in communication with an opening formed in the top face of said cylinder for discharging coffee into said compartments, a plurality of agitators mounted in said hopper on a spring-biased arm projecting downwardly from said hopper for engagement with the fingers on said cylinder shaft whereby said agitators will be actuated in one direction upon rotation of said fingers and in an opposite direction by the spring-bias on said arm.

10. An apparatus for brewing coffee and dispensing the brew therefrom, comprising a housing having a rotatable member carried on a vertical axis therein and movable only in a horizontal plane, three filter cups radiating outwardly from said member and angularly spaced thereabout for rotation therewith, drive means movable only in a plane parallel to said horizontal plane for rotating said member in said horizontal plane about said axis for advancing said filter cups in a step-wise sequence between three successive stations comprising a coffee-receiving station, a dispensing station, and a rinsing station, said stations being angularly spaced about said axis, said housing having an opening formed therein for the reception of a cup for receiving the brewed coffee from the filter cup at the dispensing station, a coffee dispenser mounted in said housing for dispensing dry coffee into the filter cup at said coffee-receiving station, a tank of heated water mounted in said housing, a first conduit connected to said water tank and having a discharge outlet angularly spaced about said axis with respect to said coffee dispenser for discharging water into the filter cup at said dispensing station, whereby said water will contact the coffee in said filter cup and the resultant brew will pass therefrom into said cup, means for rotating said filter cups to and from an inverted position as they are moved to and from said rinsing station, a second conduit connected to a water source and having a discharge outlet angularly spaced about said axis with respect to said coffee dispenser and the discharge outlet of said first conduit, the inlet from said water source being disposed adjacent the upper end of the housing and said second conduit extending downwardly therefrom with its lower end curved upwardly to flush water against the inner walls of the inverted cup at the rinsing station for flushing the coffee therefrom, and valve means operatively connected to said drive means for controlling the flow of water from said water tank and water source.

11. An apparatus for brewing coffee and dispensing the brew therefrom, comprising a housing having a rotatable member carried on a vertical axis therein and movable only in a horizontal plane, a plurality of filter cups radiating outwardly from said member and angularly spaced thereabout for rotation therewith, drive means movable in a plane parallel to said horizontal plane for rotating said member in said horizontal plane about said axis for advancing said filter cups in a step-wise sequence between three successive stations comprising a coffee-receiving station, a dispensing station, and a rinsing station, said stations being angularly spaced about said axis, said housing having an opening formed therein for the reception of a cup for receiving the brewed coffee from the filter cup at the dispensing station, a coffee dispenser mounted in said housing for dispensing dry coffee into the filter cup at said coffee-receiving station, first and second tanks of heated water mounted in said housing, a pipe inerconnecting said first and second tanks adjacent their lower ends, a water inlet for adding water to said first tank above the lower end thereof, a first conduit connected to said second tank remote from the lower end thereof for conveying water therefrom to the filter cup at said dispensing station when the water level in said second tank reaches a predetermined level, said first conduit having a discharge outlet angularly spaced about said axis with respect to said coffee dispenser, means for moving said filter cups to and from an inverted position as they are moved to and from said rinsing station, respectively, a second conduit connected to said water inlet and having a discharge outlet angularly spaced about said axis with respect to said coffee dispenser and the discharge outlet of said first conduit for flushing the coffee from the inverted filter cup at said rinsing station, and valve means in said water inlet operatively connected to said drive means for opening said water inlet to flow therethrough when a pair of said filter cups are at said dispensing and rinsing stations for causing the water to flow through said first and second conduits.

12. An apparatus as set forth in claim 11 with the addition that second valve means is mounted in said water inlet between said second conduit and first tank for controlling the volumes of water entering said first tank and displaced from said first tank to said second tank for controlling the volume of water discharged from said second tank through said second conduit.

13 An apparatus for brewing coffee and dispensing the brew therefrom, comprising a housing having a vertically extending shaft mounted therein, a sleeve rotatably mounted on said shaft, a plurality of angularly spaced filter cups mounted on said sleeve for rotation therewith, a drive wheel mounted on said shaft and having a plurality of circumferentially spaced notches formed therein, a drive motor having an output shaft, an arm mounted on said output shaft having at least one stud engageable with the notches in said drive wheel for rotating said member in a step-wise sequence for successively advancing said filter cups from a coffee-receiving station to a dispensing station to a rinsing station, said housing having an opening formed therein for the reception of a cup for receiving the brewed coffee from the filter cup at the dispensing station, a coffee dispenser mounted in said housing for dispensing dry coffee into the filter cup at said coffee-receiving station, a first conduit connected to a heated water source for discharging water into the filter cup at said dispensing station whereby said water will contact the coffee in said filter cup and the resultant brew will pass therefrom into said cup, means for rotating said filter cups to and from an inverted position as they are moved to and from said rinsing station, respectively, and a second conduit connected to a water source for flushing the coffee from the inverted filter cup at said rinsing station.

14. An apparatus as set forth in claim 13 with the addition that said motor is actuated by a momentary switch, and a cam is mounted in said output shaft engageable with a motor switch for actuating said motor for a predetermined time interval.

15. An apparatus for brewing coffee and dispensing the brew therefrom, comprising a housing having a vertically extending shaft mounted therein, a sleeve rotatably mounted on said shaft and movable only in a horizontal plane, a plurality of angularly spaced filter cups radiating outwardly from said sleeve for rotation therewith from a coffee-receiving station to a dispensing station to a rinsing station, said stations being angularly spaced about said shaft, said housing having an opening formed therein for the reception of a cup for receiving brewed coffee from the filter cup at the dispensing station, a coffee dispenser mounted in said housing for dispensing dry coffee into the filter cup at the coffee-receiving station, a tank of heated water mounted in said housing, a first conduit connected to said water tank for discharging water into the filter cup at said dispensing station, whereby said water will contact the coffee in said filter cup and the resultant brew will pass therefrom into said cup, means disposed radially inwardly from said filter cups for rotating said filter cups to and from an inverted position as they are moved to and from said rinsing station, a second conduit connected to a water source and having a discharge outlet in the path of rotation of said filter cups for flushing the coffee from the inverted filter cup at said rinsing station, a motor having means operatively connected to said sleeve and movable only in a plane parallel to said horizontal plane for rotating said sleeve in a step-wise sequence for successively advancing said filter cups to said coffee-receiving, dispensing, and rinsing stations, a first switch actuated by said motor and operatively connected to valve means for controlling the flow of water from said water tank and water source, and a second switch actuated by said motor and operatively connected thereto for controlling the operating cycle of said motor.

16. An apparatus as set forth in claim 15 in which said first and second switches are actuated by a pair of cams mounted on the output shaft of said motor, one of said pair of cams actuating said second switch to effect rotation of said filter cups to their next respective stations, and the other of said pair of cams actuating said first switch for effecting water flow after said rotation.

17. An apparatus as set forth in claim 16 with the addition that said motor is connected to a momentary switch for actuating said motor to cause said one of said pair of cams to actuate said second switch.

References Cited by the Examiner
UNITED STATES PATENTS

| | | | |
|---|---|---|---|
| 938,378 | 10/1909 | Grothe | 210—328 X |
| 2,910,928 | 11/1959 | Rota. | |
| 2,955,527 | 10/1960 | Collins | 99—289 |
| 3,143,058 | 8/1964 | Jannin | 99—283 |

WALTER A. SCHEEL, *Primary Examiner.*

JOSEPH D. BEIN, *Examiner.*

S. P. FISHER, *Assistant Examiner.*